Jan. 25, 1938. E. E. HEWITT 2,106,485
INSECT EXCLUDER
Filed May 4, 1937

INVENTOR
ELLIS E. HEWITT
BY *Wm. M. Cady*
ATTORNEY

Patented Jan. 25, 1938

2,106,485

UNITED STATES PATENT OFFICE 2,106,485

INSECT EXCLUDER

Ellis E. Hewitt, Edgewood, Pa., assignor to The Westinghouse Air Brake Company, Wilmerding, Pa., a corporation of Pennsylvania Application May 4, 1937, Serial No. 140,597

15 Claims. (Cl. 303—1)

This invention relates to a fluid pressure brake equipment and particularly to means adapted to be applied to a vent passage in a brake controlling valve device which is open to the atmosphere in order to prevent the vent passage from being closed or partially restricted by dirt or foreign matter deposited therein by insects or otherwise.

It is an object of this invention to provide an improved insect excluder and vent passage protector.

A further object of the invention is to provide an improved vent passage protector adapted to be employed on valve devices of the type now in service.

Another object of the invention is to provide an improved vent passage protector of the type described and adapted to be secured on valve devices now in service without alteration of these devices, or with only slight alteration thereof.

A further object of the invention is to provide an improved vent passage protector which is simple and inexpensive to construct, and which is efficient in operation.

Another object of the invention is to provide an improved vent passage protector which can be easily and quickly installed.

Figure 1:
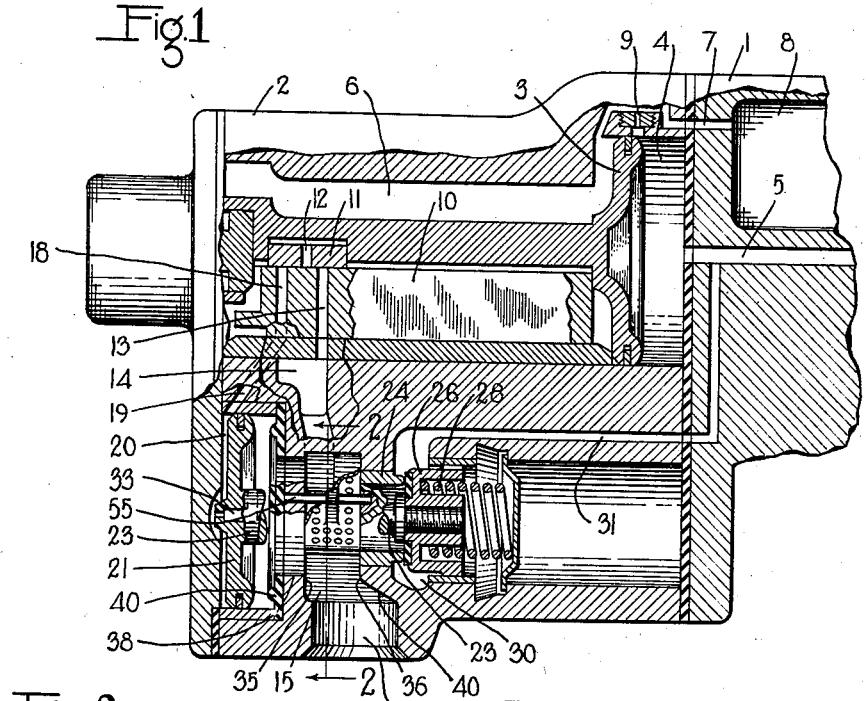
Figure 2:
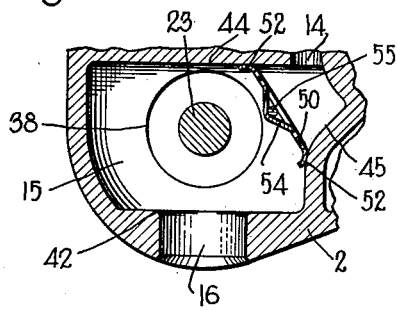
Figure 3:
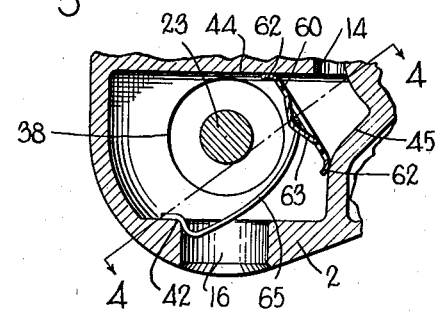
Figure 4:
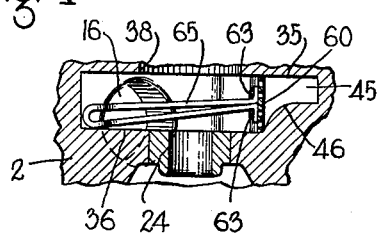
Figure 5:
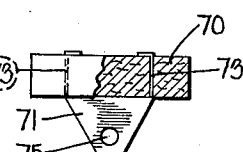
Figure 6:
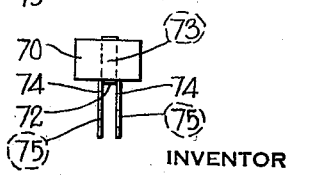

Other objects of the invention and features of novelty will be apparent from the following description taken in connection with the accompanying drawing, in which Fig. 1 is a view, largely in section, of a portion of a brake controlling valve device equipped with the insect excluder and vent passage protector provided by this invention, a portion of the vent passage protector being broken away in order to show portions of the valve device, Fig. 2 is a sectional view, taken substantially along the line 2—2 of Fig. 1, Fig. 3 is a sectional view similar to Fig. 2, and showing a modified form of vent passage protector embodying this invention, Fig. 4 is a sectional view taken substantially along the line 4—4 of Fig. 3, Fig. 5 is a view partly in section of another form of vent passage protector embodying this invention, and Fig. 6 is another view of the protector shown in Fig. 5.

In Fig. 1 of the drawing there is illustrated a portion of a brake controlling valve device of the type with which the vent passage protector provided by this invention is adapted to be employed. The valve device shown in the drawing is of the type shown in U. S. Patent No. 2,031,213, issued February 18, 1936, to Clyde C. Farmer, and includes a pipe bracket section 1 and an emergency section 2.

The emergency section 2 comprises a body having a bore therein in which is mounted a piston 3 having at one side a chamber 4 which is connected by way of a passage 5 in the pipe bracket section 1 to the brake pipe, not shown. The piston 3 has at the other side a valve chamber 6 which is constantly connected by way of a passage 7 with a quick action chamber 8 formed in the pipe bracket section 1. The valve chamber 6 and the quick action chamber 8 are adapted to be charged with fluid under pressure supplied from the brake pipe through a restricted port 9 controlled by the piston 3.

A main slide valve 10 and an auxiliary slide valve 11 having movement relative to the main slide valve are mounted in the valve chamber 6 and are operated by means of the piston 3.

In operation the emergency piston 3 is adapted to respond to a service reduction in brake pipe pressure in the chamber 4, and moves the auxiliary slide valve 11 relative to the main slide valve 10 to a service position in which a port 12 through the auxiliary slide valve registers with a port 13 through the main slide valve 10, while in this position of the main slide valve 10, the port 13 registers with a discharge passage 14 which is open to an exhaust or vent chamber 15 formed in the body of the emergency section 2, while this chamber is open to the atmosphere through a relatively large vent opening 16.

Upon movement of the auxiliary slide valve 11 to the service position, fluid under pressure is released from the valve chamber 6, and from the quick action chamber 8, at a rate sufficient to reduce the pressure of the fluid in these chambers substantially as rapidly as the pressure of the fluid in the chamber 4 at the face of the piston 3 is reduced on a service reduction in brake pipe pressure to thereby prevent sufficient differential being developed between the pressure in the valve chamber 6 and in the brake pipe chamber 4 to cause the piston 3 to be moved to the emergency application position.

Upon an emergency reduction in brake pipe pressure there is a rapid reduction in the pressure of the fluid in the piston chamber 4, and the piston 3 operates to move the auxiliary slide valve 11 to an emergency position in which a port 18 through the main slide valve 10 is uncovered so that fluid under pressure from the valve chamber 6 flows through this port to a passage 19, which leads to a chamber 20 at one face of a vent valve piston 21, which is mounted in a bore in the body of the emergency section 2.

The piston 21 has a stem 23 formed integral therewith and extending across the vent chamber 15 at a point spaced from the discharge passage 14, and also spaced from the vent opening 16.

The vent valve piston stem 23 extends through a bushing 24 mounted in a bore in the body of the emergency section 2, and provided with an annular seat rib engaged by a sealing gasket carried by a vent valve 26 secured on the end of the vent valve piston stem. The vent valve 26 is yieldingly urged to the seated position by a coil spring 28 to cut off communication between the chamber 30, in which the vent valve is mounted, and the vent chamber 15. The chamber 30 is constantly connected with the brake pipe passage 5 by way of a passage 31.

On an increase in the pressure of the fluid in the chamber 20 at the face of the vent valve piston 21, force is exerted on the vent valve piston to move it to the right, as viewed in Fig. 1 of the drawing, and this movement of the vent valve piston 21 is transmitted through the piston stem 23 to move the vent valve 26 against the spring 28 to open a communication from the chamber 30 to the vent chamber 15 through which fluid under pressure is released from the brake pipe passage 5 at a rapid rate.

Fluid under pressure supplied to the chamber 20 is gradually released therefrom through a restricted passage 33 through the piston 21; and on a reduction in the pressure of the fluid in the chamber 20 to a predetermined relatively low value, the force exerted thereby on the piston 21 is insufficient to hold the vent valve 26 against the opposing force of the spring 28, and the vent valve is thereupon moved by the spring 28 into engagement with the seat rib on the bushing 24 to cut off communication between the brake pipe and the atmosphere through the vent chamber 15.

As constructed the vent opening 16, and the vent chamber 15, in the body of the emergency section 2 are relatively large in size in order to permit fluid under pressure to be vented from the brake pipe to the atmosphere at a rapid rate on an emergency application of the brakes. As these portions are of relatively large size, insects, such as wasps, or the like, may enter the vent chamber and deposit mud, or similar material in this chamber.

If mud or other material is deposited in the vent chamber 15 it may completely or partially restrict the release of fluid under pressure through the discharge passage 14, thereby interfering with the intended operation of the valve device.

The vent passage protector provided by this invention is adapted to be mounted within the vent chamber 15 to prevent access by insects, wasps, or the like, to the portion of the vent chamber with which the discharge passage 14 communicates to thereby prevent the deposit of mud, or the like, in this chamber in such a manner as to restrict the venting of fluid through the discharge passage 15.

In the valve devices as constructed at present, the vent chamber 15 has spaced substantially parallel end walls 35 and 36. The wall 35 has a circular opening 38 formed substantially centrally thereof through which the vent valve piston stem 23 extends, while this wall separates the chamber 15 from the bore in which the vent valve piston 21 is mounted. An annular rubber sealing gasket 40 is mounted against the wall 35 in the bore in which the vent valve piston reciprocates.

The wall 36 of the vent chamber 15 has an opening therein opposite the opening 38 in the wall 35, and the bushing 24 is secured in this opening.

The lower portion of the vent chamber 15 is open to the atmosphere through the vent opening 16, which is somewhat larger in diameter than the distance between the end walls 35 and 36. The lower portion of the wall 36 is cut away, as indicated at 40, to provide for the free flow of fluid from the vent chamber 15 to the vent opening 16, while a shoulder, indicated at 42 in Fig. 2 of the drawing, is formed at the juncture of the wall of the vent opening 16 with the lower wall of the vent chamber 15.

The end walls 35 and 36 of the vent chamber 15 are joined by connecting walls 44 and 45 which intersect at a point remote from the vent opening 16, while the walls 44 and 45 diverge away from this point. The discharge passage 14 communicates with the vent chamber 15 at a point between the end walls 35 and 36 and adjacent the juncture of the connecting walls 44 and 45, while the material of the body of the emergency section extends toward the wall 35 in this region, as indicated at 46, and as is best shown in Figs. 1 and 4 of the drawing.

The protector provided by this invention is adapted to be mounted within the vent chamber 15 to prevent access to the portion of the vent chamber with which the discharge passage 14 communicates to thereby prevent the deposit of mud or other foreign material in this portion of the vent chamber.

The protector shown in Figs. 1 and 2 of the drawing comprises a foraminous member in the form of a sheet metal member 50 having a plurality of relatively small holes formed therein. The member 50 is of substantially uniform width throughout, and is of a width approximately equal to the distance between the end walls 35 and 36 of the vent chamber 15.

The member 50 is provided with curved ends, as indicated at 52 in Fig. 2 of the drawing, which are adapted to engage the diverging walls 44 and 45, while the member 50 is of such length that when the ends thereof are in engagement with the walls 44 and 45, the member 50 is located adjacent to, but spaced from, the portion 46 of the body of the emergency section.

A strap indicated at 54 is severed from the main portion of the member 50, and is offset or depressed relative thereto, as best shown in Fig. 2 of the drawing. The body of the emergency section 2 is provided with aligned openings, one of which is in the form of a blind opening in the wall 36, while the other is an opening which extends through the wall 35. A pin 55 is secured in these openings and extends through the space between the strap 54 and the main portion of the member 50, and secures the member 50 in position in the vent chamber 15.

The form of protector shown in Figs. 1 and 2 of the drawing is intended to be installed in the emergency section before this section is completely assembled. In order to install this protector, the member 50 is inserted in the vent chamber 15 through the vent opening 16, and is then held in a position in which the opening between the strap 54 and the main body of the member 50 is substantially in alignment with the openings in the body of the emergency section in which the pin 55 is secured. The pin 55 is then inserted so as to extend between the strap 54 and the main body of the member 50.

The various parts of the protector and of the valve device in which it is mounted are preferably arranged and proportioned so that the central portion of the sheet metal member 50 must be bent or sprung slightly to bring the aperture between the strap 54 and the main body of the member 50 into alignment with the openings through which the pin 55 extends. As a result, therefore, the ends of the member 50 will be yieldingly pressed against the body of the emergency section. This will serve to lock the member 50 in place, and to also secure the pin 55 in position.

After the pin 55 has been inserted in position, the gasket 40 is mounted in the bore in which the vent valve piston 21 reciprocates. This gasket overlies the end of the pin 55, and prevents the pin from moving out of the openings in which it is mounted.

It will be seen that when the protector provided by this invention is in position in the vent chamber 15, it prevents access to the portion of the chamber with which the discharge passage 14 communicates, and thereby prevents wasps, insects, or the like, from depositing mud or other foreign material in this portion of the chamber where it might interfere with the discharge of fluid under pressure through the discharge passage, thereby interfering with the intended operation of the valve device.

It will be seen also that the protector 50 provided by this invention is arranged to permit the free discharge of fluid under pressure from the discharge passage 14 to the vent chamber 15, from which fluid is released to the atmosphere through the relatively large vent opening 16. In addition, it will be seen that because of the relatively large area of the member 50, and the relatively large number of holes extending through this member, there is little possibility that the flow of fluid through this member will be restricted by the deposit of mud or the like on the member to a degree to restrict the release of fluid under pressure through the discharge passage 14.

In addition, it will be seen that the protector provided by this invention is mounted in the vent chamber 15 in a position in which it does not interfere with or restrict in any way the flow of fluid from the passage through the bushing 24 to the vent chamber 15 and to the atmosphere. As a result, therefore, fluid may be released at a rapid rate from the brake pipe passage 5 to the atmosphere by operation of the vent valve 26 and this flow of fluid will not be impeded by the protector provided by this invention.

In Figs. 3 and 4 of the drawing there is shown a modified form of protector provided by this invention. The protector shown in these figures of the drawing comprises a member 60 which is generally similar to the member 50 in the form of the invention shown in Figs. 1 and 2 of the drawing. The member 60 comprises a section of sheet metal of substantially the same width as the space between the end walls 35 and 36 of the vent chamber 15, and is provided with curved end portions, as indicated at 62, adapted to engage the diverging walls 44 and 45 of the vent chamber 15.

The member 60 has a pair of strips extending lengthwise thereof separated from the main body of the member 60, and depressed or offset relative thereto in a manner similar to the way in which the strap 54 is formed. These strips, which are indicated at 63, extend generally parallel to each other and are spaced apart a short distance. A spring 65 is provided, and is formed from suitable resilient material, such as spring wire. The spring 65 is substantially U-shaped in one plane, as is best shown in Fig. 4 of the drawing, while the ends of the spring extend between the strips 63, and the tips are bent substantially at right angles so as to form a hinged connection between the spring and the member 60.

The arms of the U-shaped spring 65 are curved in one plane, as is best shown in Fig. 3 of the drawing, so as to be spaced a substantial distance from the vent valve piston stem 23, while the end of the spring remote from the member 60 has a reverse curve therein which is adapted to rest upon the shoulder 42 formed at the juncture of the wall of the vent opening 16 with the lower wall of the vent chamber 15.

The various parts of the protector shown in Figs. 3 and 4 of the drawing are arranged and proportioned so that when the member 60 is in position in the vent chamber 15, and the end of the spring 65 is resting upon the shoulder 42, the spring 65 exerts force on the member 60 to press the curved end portions 62 thereof against the diverging walls 44 and 45 to thereby maintain the member 60 in this position in the vent chamber.

The various parts of the protector shown in Figs. 3 and 4 are proportioned so that they may be inserted into the vent chamber 15 through the vent opening 16, and, after they are in position in this chamber, to permit the member 60 to be arranged in the position in which it is shown in Figs. 3 and 4 of the drawing, and also to permit the spring 65 to be placed in position in engagement with the shoulder 42. As this form of protector may be inserted into the vent chamber 15 through the vent passage 16, and may be thereafter secured in position, it can be readily installed in valve devices of this type which are already in service, and does not necessitate removal of any of the parts of these valve devices, or alteration of the valve devices in any way.

The operation of the form of protector shown in Figs. 3 and 4 of the drawing is substantially the same as that shown in Figs. 1 and 2 of the drawing.

In Figs. 5 and 6 of the drawing there is shown still another form of protector embodying this invention. This form of protector is intended to be employed in place of the form shown in Figs. 1 and 2 of the drawing, and differs from that form as it employs a different type of foraminous material.

The form of protector shown in Figs. 5 and 6 of the drawing has a foraminous member constructed of a piece of relatively rigid felt indicated at 70. This felt is of a width substantially equal to the distance between the end walls 35 and 36 of the vent chamber 15, and of a length sufficient to extend between the diverging walls 44 and 45 in substantially the same manner as the member 50 shown in Figs. 1 and 2 of the drawing.

The felt member 70 has associated therewith securing means comprising a sheet metal member indicated generally at 71, and having a body portion indicated at 72 adapted to engage the rear face of the felt member 70 and to extend lengthwise thereof. The body portion 72 has tongues 73 extending at right angles thereto and extending through the felt member 70, the ends of these tongues being bent over, as best shown in Fig. 5 of the drawing, to secure the member 71 to the felt.

The body portion 72 of the member 71 also has ears 74 extending at right angles thereto, and provided with openings indicated at 75 adapted to receive a pin similar to that indicated at 55 in Figs. 1 and 2 of the drawing.

When the protector shown in Figs. 5 and 6 of the drawing is in position in the vent chamber 15, the felt member 70 prevents wasps, insects, or the like, from reaching the portion of the vent chamber with which the discharge passage 14 communicates, while it also permits fluid under pressure to flow from the discharge passage 14 to the portion of the vent chamber open to the vent opening 16.

While three embodiments of the improved insect excluder and vent passage protector provided by this invention have been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a fluid pressure brake, in combination, a brake pipe, a valve device having a body having a vent chamber therein open to the atmosphere through a relatively large vent opening, said valve device being operable on a reduction in brake pipe pressure to vent fluid under pressure to a discharge passage in said body open to said vent chamber, and means to prevent interference with the venting of fluid through said discharge passage, said means comprising a foraminous member mounted in said vent chamber and separating the portion of the vent chamber at the end of the discharge passage from the portion of the vent chamber open to the vent opening.

2. In a fluid pressure brake, in combination, a brake pipe, a valve device having a body having a vent chamber therein open to the atmosphere through a relatively large vent opening, said body also having a discharge passage formed therein and communicating with said vent chamber at a point spaced from said vent opening, the walls of said vent chamber diverging away from said discharge passage, said valve device being operable on a reduction in brake pipe pressure to vent fluid under pressure through said discharge passage, and means to prevent interference with the venting of fluid through said discharge passage, said means comprising a foraminous member mounted in said vent chamber and held in engagement with said diverging walls at a point spaced from the end of said discharge passage to separate the portion of the vent chamber adjacent the end of the discharge passage from the portion of the vent chamber open to the vent opening.

3. In a fluid pressure brake, in combination, a brake pipe, a valve device having a body having a vent chamber therein open to the atmosphere through a relatively large vent opening, said vent chamber having spaced substantially parallel end walls joined by diverging connecting walls, said body also having formed therein a discharge passage communicating with said vent chamber at a point between said end walls and adjacent the juncture of said diverging walls, said valve device being operable on a reduction in brake pipe pressure to vent fluid under pressure through said discharge passage, and means to prevent interference with the venting of fluid through said discharge passage, said means comprising a foraminous member mounted in said vent chamber and extending between said end walls, portions of said member engaging said diverging walls, said member separating the portion of the vent chamber open to the discharge passage from the portion of the vent chamber open to the vent opening, and a pin secured in aligned openings in said chamber end walls for maintaining said foraminous member in position.

4. In a protector adapted to be employed in a valve device of the type having a body having a vent chamber therein open to the atmosphere through a relatively large vent opening, said body having therein a vent valve controlling a vent passage open to said vent chamber, said body also having a discharge passage therein opening to said vent chamber at a point spaced from the vent opening and spaced from said vent passage, the valve device incorporating means for venting fluid under pressure through said discharge passage and also incorporating means for actuating said vent valve to vent fluid through said vent passage at a relatively rapid rate, the protector comprising a foraminous member adapted to be secured in said vent chamber and operable when in position in said chamber to separate the portion of said chamber open to the discharge passage from the portions of said chamber open to the vent passage and open to the vent opening, and means for securing said member in said chamber.

5. In a protector adapted to be employed in a valve device of the type having a body having a vent chamber therein open to the atmosphere through a relatively large vent opening, said body having therein a vent valve controlling a vent passage open to said vent chamber, said body also having a discharge passage therein opening to said vent chamber at a point spaced from the vent opening and spaced from said vent passage, the valve device incorporating means for venting fluid under pressure through said discharge passage and also incorporating means for actuating said vent valve to vent fluid through said vent passage at a relatively rapid rate, the protector comprising a foraminous member adapted to be secured in said vent chamber and operable when in position in said chamber to separate the portion of said chamber open to the discharge passage from the portions of said chamber open to the vent passage and open to the vent opening, and means for securing said member in said chamber, said member and said securing means therefore being insertable into said chamber through said vent opening.

6. A protector adapted to be employed with a valve device of the type having a body having a vent chamber therein open to the atmosphere through a relatively large vent opening, and having a discharge passage formed therein and communicating with said vent chamber at a point remote from said vent opening, the valve device incorporating means for venting fluid under pressure through said discharge passage, the protector comprising a foraminous member adapted to be mounted in said vent chamber to separate the portion of said vent chamber open to the discharge passage from the portion of said vent chamber open to the vent opening, and means associated with said member for securing said member in position in said chamber.

7. A protector adapted to be employed with a valve device of the type having a body having a vent chamber therein open to the atmosphere through a relatively large vent opening, and having a discharge passage formed therein and communicating with said vent chamber at a point remote from said vent opening, the valve device incorporating means for venting fluid under pressure through said discharge passage, the protector comprising a foraminous member adapted to be mounted in said vent chamber to separate the portion of said vent chamber open to the discharge passage from the portion of said vent chamber open to the vent opening, and means associated with said member for securing said member in position in said chamber, said member and the securing means therefore being insertable into said chamber through said vent opening.

8. A protector adapted to be employed with a valve device of the type having a body having a vent chamber therein open to the atmosphere through a relatively large vent opening, and having a discharge passage formed therein and communicating with said vent chamber at a point remote from said vent opening, the valve device incorporating means for venting fluid under pressure through said discharge passage, the protector comprising a foraminous member adapted to be mounted in said vent chamber to separate the portion of said vent chamber open to the discharge passage from the portion of said vent chamber open to the vent opening, and a spring associated with said member and engageable with a wall of said chamber at a point generally opposite the point of connection of said discharge passage with said vent chamber for yieldingly securing said member in position in said chamber.

9. In a protector adapted to be employed in a valve device of the type having a body having a vent chamber therein open to the atmosphere through a relatively large vent opening, said chamber having spaced substantially parallel end walls joined by diverging connecting walls, said body having a discharge passage formed therein and communicating with said vent chamber at a point between said end walls and adjacent the juncture of said diverging connecting walls, the valve device incorporatong means for venting fluid through said discharge passage, the protector comprising a foraminous member adapted to be mounted in said vent chamber, said member being formed of a width substantially equal to the distance between the end walls of said chamber, the ends of said member being adapted to engage said diverging connecting walls to separate the portion of said vent chamber open to the discharge passage from the portion of said vent chamber open to the vent opening, and means for maintaining said member in position in said chamber.

10. In a protector adapted to be employed in a valve device of the type having a body having a vent chamber therein open to the atmosphere through a relatively large vent opening, said chamber having spaced substantially parallel end walls joined by diverging connecting walls, said body having a discharge passage formed therein and communicating with said vent chamber at a point between said end walls and adjacent the juncture of said diverging connecting walls, the valve device incorporating means for venting fluid through said discharge passage, the protector comprising a foraminous member adapted to be mounted in said vent chamber, said member being formed of a width substantially equal to the distance between the end walls of said chamber, the ends of said member being adapted to engage said diverging connecting walls to separate the portion of said vent chamber open to the discharge passage from the portion of said vent chamber open to the vent opening, said member having an offset portion disposed intermediate the edges thereof and an element extending between said member and the offset portion thereof and adapted to be secured in aligned openings formed in the end walls of said vent chamber for securing said member in position in said chamber.

11. In a protector adapted to be employed in a valve device of the type having a body having a vent chamber therein open to the atmosphere through a relatively large vent opening, said chamber having spaced substantially parallel end walls joined by diverging connecting walls, said body having a discharge passage formed therein and communicating with said vent chamber at a point between said end walls and adjacent the juncture of said diverging connecting walls, the valve device incorporating means for venting fluid through said discharge passage, the protector comprising a foraminous member adapted to be mounted in said vent chamber, said member being formed of a width substantially equal to the distance between the end walls of said chamber, the ends of said member being adapted to engage said diverging connecting walls to separate the portion of said vent chamber open to the discharge passage from the portion of said vent chamber open to the vent opening, and a spring extending between said member and the opposite side of said vent chamber for maintaining said member in position in said vent chamber.

12. In a protector adapted to be employed in a valve device of the type having a body having a vent chamber therein open to the atmosphere through a relatively large vent opening, said chamber having spaced substantially parallel end walls joined by diverging connecting walls, said body having a discharge passage formed therein and communicating with said vent chamber at a point between said end walls and adjacent the juncture of said diverging connecting walls, the valve device incorporating means for venting fluid through said discharge passage, the protector comprising a foraminous member adapted to be mounted in said vent chamber, said member being formed of a width substantially equal to the distance between the end walls of said chamber, the ends of said member being adapted to engage said diverging connecting walls to separate the portion of said vent chamber open to the discharge passage from the portion of said vent chamber open to the vent opening, and a spring extending between said member and the opposite side of said vent chamber for maintaining said member in position in said vent chamber, said member and said spring being insertable into said vent chamber through said vent opening.

13. In a protector adapted to be employed in a valve device of the type having a body having a vent chamber therein open to the atmosphere through a relatively large vent opening, said chamber having spaced substantially parallel end walls joined by diverging connecting walls, said body having a discharge passage formed therein and communicating with said vent chamber at a point between said end walls and adjacent the juncture of said diverging connecting walls, the valve device incorporating means for venting fluid through said discharge passage, the protector comprising a relatively rigid felt member of a width substantially equal to the distance between the end walls of the vent chamber, the ends of said felt member being adapted to engage said diverging connecting walls to separate the portion of the vent chamber open to the discharge passage from the portion of the vent chamber open to the vent opening, and means for securing said felt member in position in said chamber.

14. In a protector adapted to be employed in a valve device of the type having a body having a vent chamber therein having spaced substantially parallel end walls joined by diverging connecting walls, said body having a relatively large vent opening therein communicating with said vent chamber at a point intermediate said chamber end walls, said body having a shoulder thereon at the juncture of the wall of said vent opening and a connecting wall of said vent chamber, said body also having a discharge passage formed therein and communicating with said vent chamber at a point generally opposite said vent opening and between said chamber end walls and also adjacent the juncture of said diverging connecting walls, the protector comprising a foraminous member adapted to be mounted in said vent chamber, said member being formed of a width substantially equal to the distance between the end walls of said chamber, the ends of said member being adapted to engage the diverging connecting walls to separate the portion of said vent chamber open to said discharge passage from the portion of said vent chamber open to the vent opening, and a spring adapted to extend between said member and the shoulder on said body for securing said member in position in said vent chamber.

15. In a protector adapted to be employed in a valve device of the type having a body having a vent chamber therein having spaced substantially parallel end walls joined by diverging connecting walls, said body having a relatively large vent opening therein indicating with said vent chamber at a point intermediate said chamber end walls, said body having a shoulder thereon at the juncture of the wall of said vent opening and a connecting wall of said vent chamber, said body also having a discharge passage formed therein and communicating with said vent chamber at a point generally opposite said vent opening and between said chamber end walls and also adjacent the juncture of said diverging connecting walls, the protector comprising a foraminous member adapted to be mounted in said vent chamber, said member being formed of a width substantially equal to the distance between the end walls of said chamber, the ends of said member being adapted to engage the diverging connecting walls to separate the portion of said vent chamber open to said discharge passage from the portion of said vent chamber open to the vent opening, and a spring having one end thereof connected to said member substantially centrally thereof, the other end of said spring having a portion adapted to press against the shoulder on said body to maintain the member in position in said chamber.

ELLIS E. HEWITT.